Patented Feb. 29, 1944

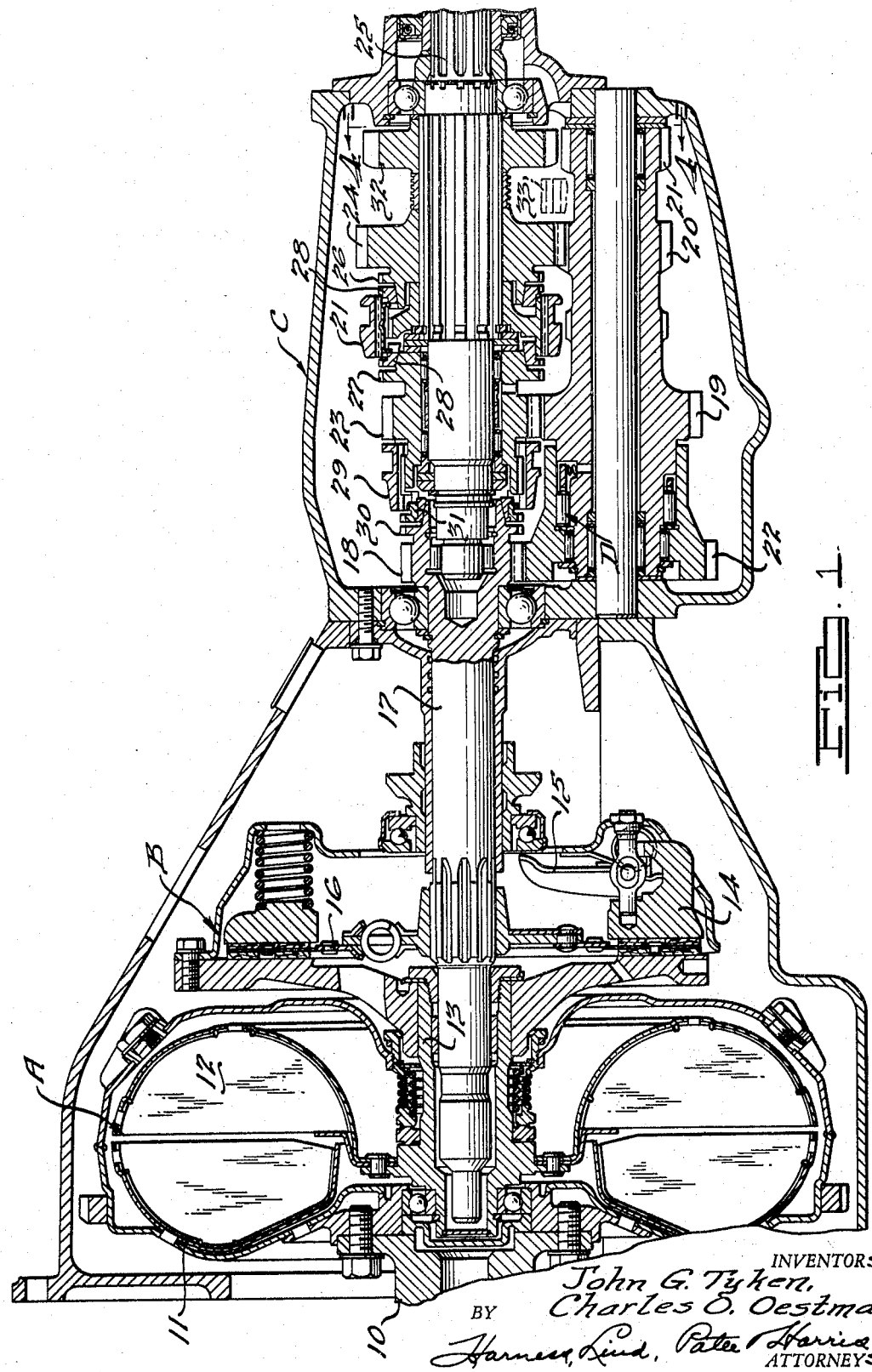

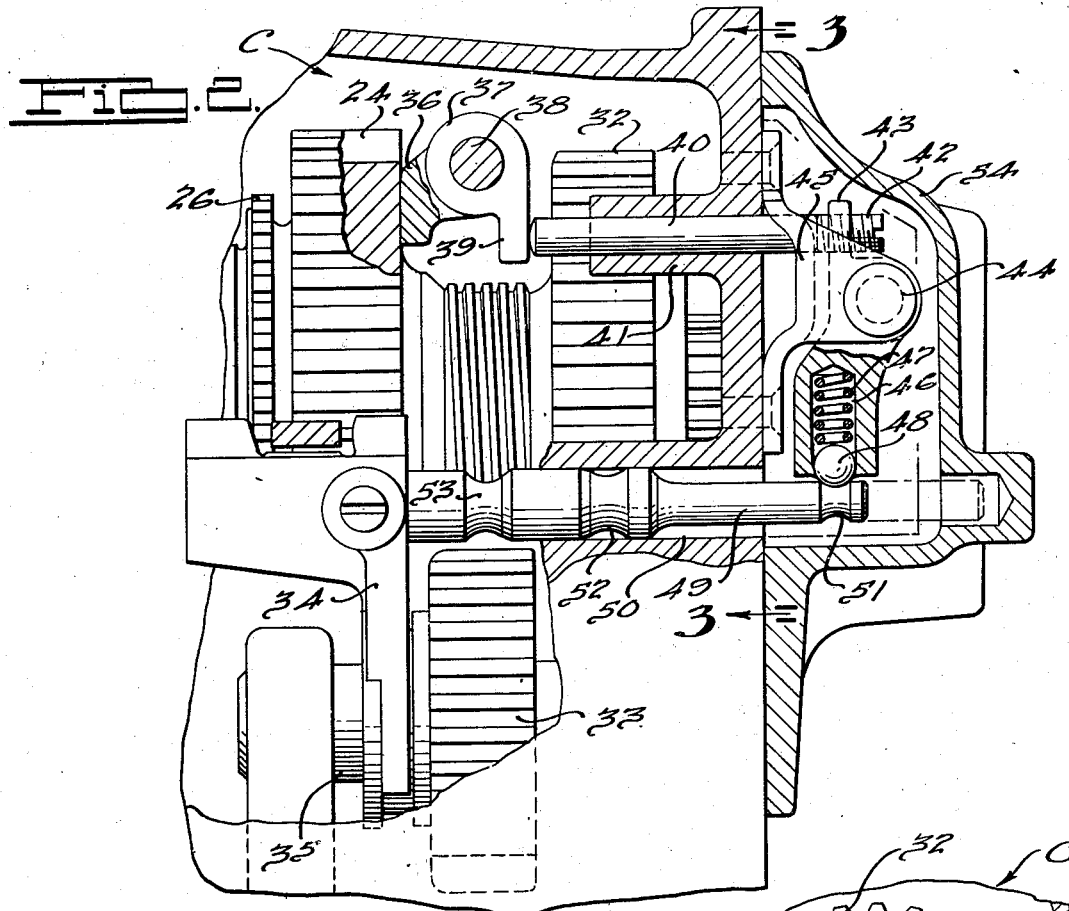
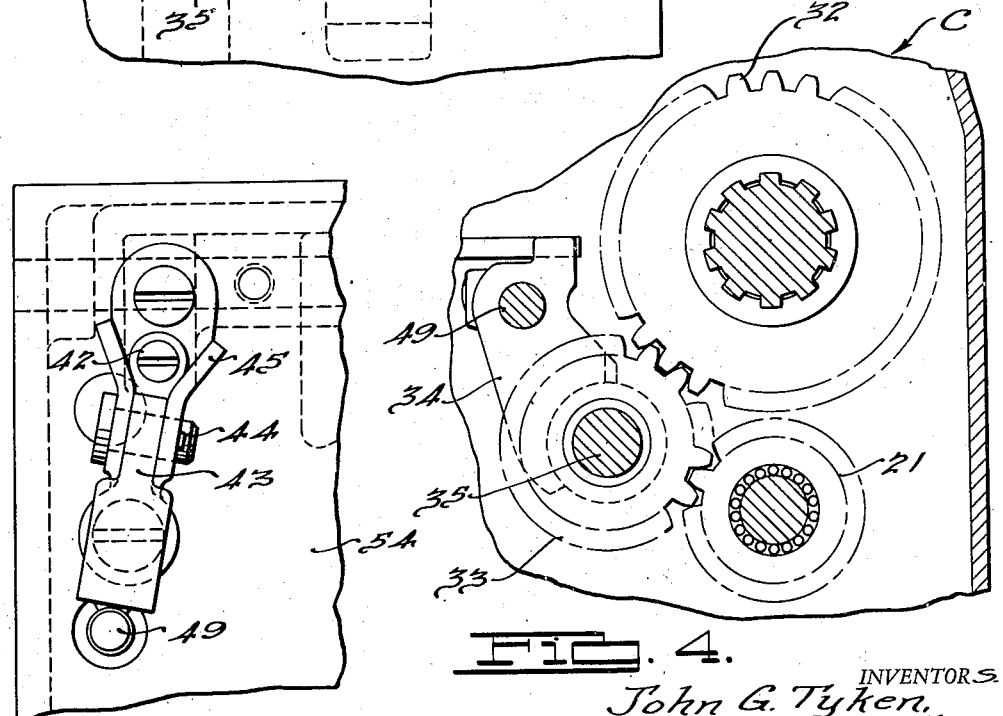

2,342,985

UNITED STATES PATENT OFFICE 2,342,985

SYNCHRONIZER

John G. Tyken and Charles O. Oestman, Detroit, Mich., assignors to Chrysler Corporation, Highland Park, Mich., a corporation of Delaware Application December 12, 1941, Serial No. 422,628

14 Claims. (Cl. 74—339)

This invention relates to synchronizers and more particularly to improvements in motor vehicle transmissions embodying engageable parts subject to clash-engagement.

One object of my invention is to provide improved means for synchcronizing engageable transmission parts which do not lend themselves to conventional methods of synchronization.

Another object is to synchronize, in an improved and simplified manner, engageable transmission elements by bringing one of the elements to the speed of the other prior to their engagement, especially where such elements are ordinarily engaged at a time when the speed of one is zero and where the other element is subject to rotational drag or spin. With such an arrangement the synchronizer acts as a brake.

A further object is to provide an improved synchronizer for transmission elements adapted to be engaged when the vehicle is at a standstill. In many transmissions, synchromesh mechanism is provided for speed ratio changes other than a drive ratio used to propel the vehicle from standstill. Because of the inertia of the transmission parts, clutch drag or spin, or other factors, clashing of the engageable parts frequently results, our invention being adapted to overcome such objections.

A further object is to provide improved means for synchronizing engaging gears of a reverse drive gear set.

Further objects and advantages of our invention will be more apparent as this specification progresses, reference being made to the accompanying drawings illustrating one embodiment thereof and in which:

Fig. 1 is a longitudinal sectional elevational view through our transmission.

Fig. 2 is an enlarged sectional elevational view of the rear portion of the transmission, the section being taken to show the reverse gear shift.

Fig. 3 is a transverse sectional view taken as indicated by line 3—3 of Fig. 2.

Fig. 4 is a similar view taken as indicated by line 4—4 of Fig. 1.

In order to illustrate the principles of our invention we have shown the same in connection with the shiftable reverse idler of a transmission which in general is of known commercial type wherein we have made provision for synchronizing the engageable parts for driving the vehicle in a starting ratio—reverse in this instance.

The illustrated transmission comprises an engine drive shaft 10 carrying the vaned impeller 11 of fluid coupling A. The impeller drives the vaned runner 12 by fluid circulation in known manner, this runner driving shaft 13 to which is fixed the driving member 14 of a conventional friction clutch B having release levers 15. The driven clutch member 16 is splined to the transmission input shaft 17 carrying the main drive pinion 18 in transmission C.

The transmission may be of any desired type, that illustrated being in general the transmission used on 1941 Chrysler "Fluid Drive" modified to incorporate my invention. This transmission comprises countershaft gearing drivingly connected to shaft 17. This gearing embodies a countershaft cluster having gears 19, 20, 21 driven through overrunning clutch D by a gear 22 in constant mesh with pinion 18, the clutch D allowing the gear 22 to run slower but not faster than gears 19, 20 and 21. Two gears 23, 24 are mounted loose on the transmission output shaft 25 and are respectively in constant mesh with gears 19 and 20. A shiftable clutch sleeve 21, which is in constant drive connection with shaft 25, is adapted to selectively clutch with teeth 26 of gear 24 or with teeth 27 of gear 23 to respectively provide either first or third speed overrunning drives. The first speed drive is from shaft 10 through coupling A and clutch B to shaft 17, thence through pinion 18 and gear 22 through overrunning clutch D to gear 19, thence to gear 24, teeth 26 and sleeve 21 to shaft 25. The third speed drive is the same as first to clutch D whence this drive passes to gear 19 and gear 23, thence through teeth 27 and sleeve 21 to driven shaft 25. Blocker synchronizing rings 28 of commercial type are operably associated with sleeve 21 to insure non-clash shift of the sleeve.

A second clutch sleeve 29 is splined on a forward extension of gear 23 and is adapted to shift forwardly to clutch with teeth 30 of pinion 18 to step-up the drive from first to second or from third to direct fourth. A blocker ring 31 prevents clutching of sleeve 29 with teeth 30 until the speeds of these parts are substantially the same at a time when shaft 17 is coasting down under accommodation of clutch D. Second drive passes from shaft 17 through sleeve 29 to gear 23, thence through gears 19, 20, 24 to teeth 26 and through sleeve 21 to shaft 25. Direct drive is from shaft 17 directly through sleeve 29 to gear 23 thence through teeth 27 and sleeve 21 to shaft 25. Clutch D overruns during the drives in third and fourth.

The primary function of clutch B is to accommodate release of shaft 17 from runner 12 so as to facilitate shift of sleeve 21 between teeth 26 and 27. Shift of sleeve 29 is controlled automatically by means well known and therefore not illustrated in my drawings.

In order to drive the vehicle in reverse, a driven gear 32 is mounted fixed on shaft 25 and adapted to be engaged by rearward shift of a reverse driving idler gear 33 by its shift yoke 34. The gear 21 is the countershaft drive gear for the reverse gearing set. As in the conventional Chrysler transmission referred to, the idler gear 33 is mounted to slide on a shaft 35 so that when gear 33 is shifted rearwardly it is brought into mesh with both the gear 32 and the countershaft drive gear 21. By reason of our invention it is not necessary to modify this relationship.

Our invention contemplates the application of a synchronizing force to some portion of the transmission such that gear 21 and all parts drivingly connected thereto are brought to the speed of gear 32 as an incident to shift of gear 33 rearwardly for reverse. Inasmuch as the reverse shift is ordinarily effected when the car and therefore gear 32 have been brought to rest, this synchronizing force is in the nature of a braking force for counteracting the spin of all parts drivingly connected to shaft 17 resulting from the inertia of these parts as well as from any drag at clutch B when disengaged preparatory to the reverse shift.

In carrying out our invention we utilize the rear side face of gear 24 as a braking surface adapted to be engaged by the braking arm 36 of a brake shoe member 37 pivotally mounted at 38 to swing on an axis transversely of the transmission C. The brake element has a second arm 39 engaged by a longitudinally disposed thrust pin 40 slidably mounted in a bearing 41 of the transmission casing.

The thrust pin 40 is disposed laterally of gear 32 so as not to interfere therewith, this pin projecting rearwardly from the transmission case against an adjustable thrust screw 42 mounted in the upper end of a lever 43 which is pivotally supported at 44, between its ends, in a support bracket 45 which is secured to the rear face of the transmission casing.

The lower end of the lever 43 is provided with a drilled opening 46 receiving a spring 47 and a latch in the form of a ball 48. The reverse shift rail 49 is slidably mounted, parallel to pin 40, in a bearing 50 and, in addition to rigidly mounting the yoke 34, is adapted to releasably operate lever 43. For this operation the rail 49 is provided with a detent groove 51 engaged by the spring-pressed ball 48 when gear 33 is in its neutral position. Detent grooves 52, 53 cooperate with the conventional spring-pressed ball (not shown) for releasably locating rail 49 in its neutral and shifted positions respectively. A supplemental casing portion or cover 54 may be attached to the rear of the transmission casing cooperating therewith to enclose the parts of the brake actuating mechanism which project from the casing.

When it is desired to drive the vehicle in reverse, the vehicle is, of course, brought to a standstill and sleeves 29 and 21 in their Fig. 1 neutral positions. Then clutch B is disengaged and gear 33 shifted rearwardly to mesh with gears 21, 32 and then clutch B is engaged to effect the reverse drive which is the same as first to clutch D whence the drive passes through gears 21, 33 and 32 to shaft 25.

When clutch B is released preparatory to shifting gear 33 into reverse, the inertia of the parts including disk 16, shaft 17, the countershaft cluster and parts connected thereto, tends to keep gear 21 rotating so that gear 33 clashes, but for our invention, with gear 21. This is not only objectionable in delaying the shift but is noisy and destructive of the gear teeth. The tendency toward rotation of gear 21 is further often aggravated by drag engagement through the disengaged clutch B whereby shaft 10 drives shaft 17 even with clutch B disengaged.

By reason of our invention the aforesaid difficulties are overcome and gear 21 is synchronized with gears 32, 33 as an incident to shifting gear 33 rearwardly for reverse. At this time the gear 32 is not rotating because driven shaft 25 is stationary, the vehicle being at rest. The gear 33 is also at rest, rotationally. Our synchronizer indirectly applies a braking force to gear 21 before gear 33 engages 21 and 33 also thereby braking the countershaft cluster and drive shaft 17 as follows.

The initial rearward shift of gear 33, prior to meshing with gears 21 and 32, causes rail detent 51 to be thrust rearwardly so as to act through lever 43 and pin 40 to take up the slight clearances and thrust brake element against gear 24. Inasmuch as the brake shoe 36 cannot rotate about the axis of gear 24, a braking force is applied to this gear in an amount predetermined by the lever system and the spring detent connection between lever 43 and rail 49.

Further rearward movement of gear 33, after effecting the stopping of rotation of gear 24 and all parts connected thereto including gear 21, causes ball 48 to spring inwardly and gear 33 then engages gears 21, 32 without clash, the brake 37 being released as there is no longer any axial thrust exerted along rail 49 on lever 43. Furthermore ball 48 now engages the smooth cylindrical portion of rail 49 causing spring 47 to impart slight releasing rotation to lever 43. The opening 46 is thus disposed forwardly of the lever pivot at 44. The complete rearward shift of gear 33 is practically continuous and operates to rapidly brake gear 21 during the rearward shift of gear 33 prior to its engagement with gears 21, 32.

When returning gear 33 to its Fig. 2 neutral position, ball 48 enters groove 51 again to restore the parts.

As a feature of our invention, when used with a fluid coupling A, it is not necessary to manually release the clutch B in shifting to reverse provided that the synchronizing braking mechanism is made sufficiently rugged with reference to the drag force imposed through the coupling so as to sufficiently retard the rotation of all parts between runner 12 and the gear 21 to prevent gear clash when the gear 33 is shifted for the reverse drive. If desired, friction braking material may be applied to shoe 37 or gear 24 or both.

We claim:

1. In a transmission having axially aligned driving and driven shafts; countershaft reverse drive gearing for driving said driven shaft in reverse relative to and from said driving shaft; said reverse gearing comprising a driven gear mounted on said driven shaft and adapted for drive conection therewith, a countershaft reverse gear drivingly connected with said driving shaft, and a reverse idler gear; shift means operable to shift said idler gear, from a neutral position of disengagement with respect to said countershaft gear and said driven gear, into a second position of engagement with said countershaft gear and said driven gear thereby to provide said reverse drive; and means operable in response to gear-engaging operation of said shift means, in shifting said idler gear from its said neutral position toward its said second position for braking rotation of said countershaft reverse gear prior to engagement of said idler gear with said countershaft gear and said driven gear.

2. In a transmission having axially aligned driving and driven shafts; countershaft reverse drive gearing for driving said driven shaft in reverse relative to and from said driving shaft; said reverse gearing comprising a driven gear mounted on said driven shaft and adapted for drive connection therewith, a countershaft reverse gear drivingly connected with said driving shaft, and a reverse idler gear; shift means operable to shift said idler gear, from a neutral position of disengagement with respect to said countershaft gear and said driven gear, into a second position of engagement with said countershaft gear and said driven gear thereby to provide said reverse drive; and synchronizing braking means, in shifting said idler gear from its said neutral position toward its said second position, operable to brake rotation of said countershaft reverse gear prior to engagement of said idler gear with said countershaft reverse gear as an incident to operation of said shift means to establish said reverse drive.

3. In a transmission having axially aligned driving and driven shafts; a driven gear mounted on said driven shaft; countershaft gearing drivingly connected to said driving shaft and comprising a countershaft reverse gear; a reverse idler gear adapted to be shifted into and out of engagement with said countershaft reverse gear and said driven gear; shift means for shifting said idler gear, from a neutral position of disengagement with respect to said countershaft reverse gear and with respect to said driven gear, into a second position of engagement with these gears; and means operable in response to gear-engaging operation of said shift means, in shifting said idler gear from its said neutral position toward its said second position, for braking rotation of said countershaft reverse gear prior to engagement of said reverse idler gear with said countershaft reverse gear and said driven gear.

4. In a transmission having axially aligned driving and driven shafts; a driven gear mounted on said driven shaft; and adapted for driving connection therewith; a countershaft geared to said driving shaft; constant mesh gearing between said countershaft and said driven shaft, including a gear loosely mounted on said driven shaft; said loosely mounted gear carrying a friction surface; a countershaft reverse gear; a reverse idler gear adapted to be shifted into and out of engagement with said countershaft reverse gear and said driven gear; shift means for shifting said idler gear, from a neutral position of disengagement with respect to said countershaft reverse gear and with respect to said driven gear, into engagement with these gears; a non-rotatably mounted element carrying a friction surface; and means, operable as an incident to gear-engaging operation of said shift means, for effecting relative braking engagement of said friction surfaces prior to engagement of said reverse idler gear with said countershaft reverse gear and said driven gear.

5. In a transmission having axially aligned driving and driven shafts; a driven gear mounted on said driven shaft; countershaft gearing drivingly connected to said driving shaft and comprising a countershaft reverse gear; a reverse idler gear adapted to be shifted into and out of engagement with said countershaft reverse gear and said driven gear; shift means for shifting said idler gear, from a neutral position of disengagement with respect to said countershaft reverse gear and with respect to said driven gear, into engagement with these gears; a member rotatably mounted on said driven shaft and having constant drive connection with said countershaft reverse gear, said member carrying a friction surface; a non-rotatably mounted member carrying a friction surface; and means, operable as an incident to gear-engaging operation of said shift means, for effecting relative braking engagement of said friction surfaces prior to engagement of said reverse idler gear with said countershaft reverse gear and said driven gear.

6. In a transmission having axially aligned driving and driven shafts; a countershaft comprising forward and reverse driving countershaft gears adapted to be driven by said driving shaft; forward and reverse driven gears mounted on said driven shaft and respectively adapted to be driven by said forward and reverse countershaft gears for driving said driven shaft forwardly and reversely; a reverse idler gear adapted to mesh with said countershaft reverse gear and with said driven reverse gear; means for shifting one of said reverse gears relative to another for establishing a reverse drive from said countershaft reverse gear to said driven reverse gear through the medium of said reverse idler gear a non-rotatably mounted braking element; and means, operable as an incident to reverse-drive-establishing shift of said one reverse gear, for effecting engagement of said braking element with said forward driven gear thereby to brake rotation of said forward driven gear prior to establishment of said reverse drive.

7. In a transmission having axially aligned driving and driven shafts; a countershaft comprising forward and reverse driving countershaft gears adapted to be driven by said driving shaft; forward and reverse driven gears mounted on said driven shaft and respectively adapted to be driven by said forward and reverse countershaft gears for driving said driven shaft forwardly and reversely; a reverse idler gear adapted to mesh with said countershaft reverse gear and with said driven reverse gear; means for shifting one of said reverse gears relative to another for establishing a reverse drive from said countershaft reverse gear to said driven reverse gear through the medium of said reverse idler gear; a non-rotatable brake element adapted to engage said forward driven gear; thrust-transmitting means between said shifting means and said brake element for effecting braking engagement of said brake element with said forward driven gear as an incident to reverse-drive-establishing shift of said one reverse gear.

8. In a transmission having driving and driven shafts; means for driving the driven shaft reversely with respect to said driving shaft, said reverse driving means comprising relatively shiftable interengageable reverse drive elements; means shiftable from a neutral position thereof to effect interengagement of said reverse drive elements; a member drivingly connected to one of said reverse drive elements for rotation about the axis of said shafts, said member having a friction surface; and means operating as an incident to shift of said shiftable means from said neutral position as aforesaid for braking said friction surface prior to interengagement of said reverse drive elements.

9. In a transmission having driving and driven shafts; means for driving the driven shaft reversely with respect to said driving shaft, said reverse driving means comprising relatively shiftable interengageable reverse drive elements; means shiftable from a neutral position thereof to effect interengagement of said reverse drive elements; a member rotatable about the axis of said shafts and having a friction surface; means for rotating said member at a speed proportionate to one of said reverse drive elements; a brake element engageable with said friction surface; and means, including a lever, forming a thrust-transmitting connection between said shiftable means and said brake element so constructed and arranged as to cause braking engagement of said brake element with said friction surface as an incident to the aforesaid shift of said shiftable means from said neutral position.

10. In a transmission having driving and driven shafts; means for driving the driven shaft reversely with respect to said driving shaft, said reverse driving means comprising relatively shiftable interengageable reverse drive elements; means comprising a transmission drive-controlling element shiftable from a neutral position corresponding to neutral setting of the transmission to a second position corresponding to reverse drive setting of the transmission to effect interengagement of said reverse drive elements; a member rotatable about the axis of said shafts and having a friction surface; means for rotating said member at a speed proportionate to one of said reverse drive elements; a pivotally mounted brake element adapted for swinging movement about its pivot for braking engagement with said friction surface; and means operating in response to shift of said shiftable drive-controlling element from its said neutral position to its said second position for swinging said brake element as aforesaid.

11. In a transmission having driving and driven shafts; means for driving the driven shaft reversely with respect to said driving shaft, said reverse driving means comprising relatively shiftable interengageable reverse drive elements; means comprising a transmission drive-controlling element shiftable from a neutral position corresponding to neutral setting of the transmission to a second position corresponding to reverse drive setting of the transmission thereby to effect interengagement of said reverse drive elements; a member rotatable about the axis of said shafts and having a friction surface; means for rotating said member at a speed proportionate to one of said reverse drive elements; a brake element engageable with said friction surface; and yieldable thrust-transmitting means for effecting braking engagement between said brake element and said friction surface in response to shift of said shiftable drive-controlling element from its said neutral position to its said second position.

12. In a transmission having driving and driven shafts; means for driving the driven shaft reversely with respect to said driving shaft, said reverse driving means comprising relatively shiftable interengageable reverse drive elements; means comprising a transmission drive-controlling element shiftable from a neutral position corresponding to neutral setting of the transmission to a second position corresponding to reverse drive setting of the transmission thereby to effect interengagement of said reverse drive elements; a member rotatable about the axis of said shafts and having a friction surface; means for rotating said member at a speed proportionate to one of said reverse drive elements; a brake element engageable with said friction surface; a pin for thrusting said brake element against said friction surface; a pivotally mounted lever having one end thereof in thrust-transmitting relationship with said pin; and means operating in response to shift of said shiftable drive-controlling element from its said neutral position to its said second position for swinging said lever on its pivot.

13. In a transmission having driving and driven shafts; means for driving the driven shaft reversely with respect to said driving shaft, said reverse driving means comprising relatively shiftable interengageable reverse drive elements; means shiftable to effect interengagement of said reverse drive elements; a member rotatable about the axis of said shafts and having a friction surface; means for rotating said member at a speed proportionate to one of said reverse drive elements; a brake element engageable with said friction surface; said shiftable means including a shiftable thrust-transmitting element having a detent; a pivotally mounted lever having a spring-pressed latching element releasably engaging said detent and adapted to transmit thrust from said shiftable element to said brake element whereby to force the latter against said friction surface in response to shift of said shiftable means.

14. In a transmission having a torque input member and a torque output member; means, including a rotatable element adapted to be rotated at a speed proportionate to said input member, for transmitting forward drive from said input member to said output member; means, including interengageable drive-control elements, for transmitting reverse drive from said input member to said output member; means operable to relatively shift said interengageable elements thereby to effect interengagement of said drive-control elements thereby to control operation of said reverse drive means; said forward and reverse drive means being so constructed and arranged that said rotatable element is drivingly connected with at least one of said drive-control elements prior to operation of said interengagement-operable-means; a non-rotatably mounted braking element; and means operating in response to operation of, and during said relative shift of, said interengagement-operable-means operating said braking element for braking said rotatable element prior to interengagement of said drive-control elements.

JOHN G. TYKEN.
CHARLES O. OESTMAN.